S. O. CROSS.
Grape-Vine Frame.
No. 11,153. Patented June 27, 1854.
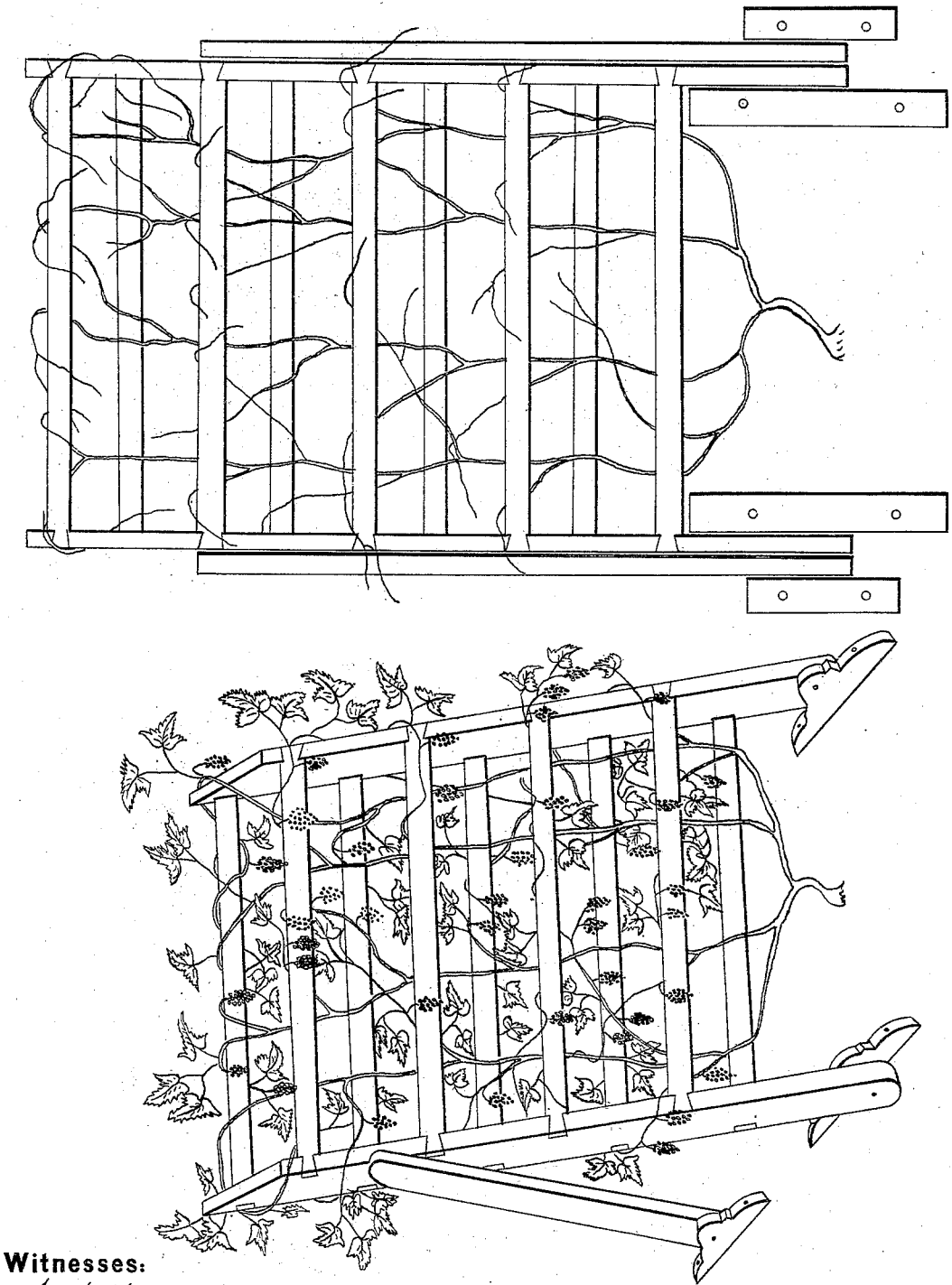
Witnesses:
Inventor:

UNITED STATES PATENT OFFICE.

S. OSCAR CROSS, OF KINGSBURY, NEW YORK.

IMPROVED GRAPE-FRAME.

Specification forming part of Letters Patent No. 11,153, dated June 27, 1854.

*To all whom it may concern:*

Be it known that I, S. OSCAR CROSS, of the town of Kingsbury, in the county of Washington and State of New York, have invented a new and Improved Grape-Frame for the Better Cultivation of the Grape; and I do hereby declare that the following is a full and exact description thereof, reference being had to the accompanying drawings, and to the letters of reference marked thereon.

The nature of my invention consists in an adjustable elevating and depressing grape-frame for the better cultivation of the grape.

To enable others to make and use my invention, I will proceed to describe its construction and operation.

I construct my grape-frame of wall-strips (two by four inches) cut to any desirable length, say, ten or twelve feet, and slats or crosspieces (of about an inch in thickness and three in width and six or seven feet long) are fastened about two feet apart to one edge of the wall-strips. The vine is now placed upon the frame and slats fastened to the other side, thus securing the vine within the frame, as represented in the accompanying drawing marked A. My frame can be supported in any position by the legs attached to it, and can be fastened there by driving pins or stakes through holes in the foot-pieces, (see accompanying drawing marked B,) or it can be fastened in various ways. The vine itself will secure the foot of the frame.

The advantages of my invention above those already in use are as follows, viz: The fruit is more easily gathered, as it can be brought to a convenient altitude. The vine is conveniently lowered to the ground, where it can be covered with straw or otherwise to protect it from winter-killing. The size of the fruit is increased by allowing the frame to lie on or near the ground, which secures to the vine a greater amount of heat, as it receives warmth from the earth as well as from the sun, and is not exposed to cold winds as much as those on elevated frames. The quantity of fruit is also increased, as it sets abundantly and grows larger on or near the ground. Another advantage is that the grape-pestiferous beetles and insects are not as destructive to buds and foliage on or near the ground as on elevated frames. My frame and method of managing it checks mildew and rot. The vine is kept small to confine it within my frame, and all grass and weeds are eradicated from under it. This of itself checks the above diseases; but should either appear the frame is elevated to the air, and if necessary turned back to the sun, which generally effects a cure. The fruit is ripened earlier on my frame than any other, because it gets its growth sooner, and its flavor is also improved, which is done by exposing it to any required amount of air and sun without resorting to the injurious practice of trimming and cutting off leaves for that purpose. Care should be had not to expose the fruit to too much sun during the early stages of ripening; but the process should be completed by giving it a full exposure. (See accompanying drawing, marked B.) The fruit is readily protected from light frosts, as it can be lowered to the ground, where it is less exposed, and if necessary, can be easily covered; or if the ground had been sown to corn or oats, as soon as the fruit was sufficiently advanced to admit of elevating the frame, it would form a mat, in which the fruit would be embedded, so as to protect it from light frosts and would be of service to protect the vine from winter-killing. Thus by my adjustable frame and method of managing it tender and choice varieties can be raised and ripened in northern latitudes with less trouble and a better prospect of success than any other known to me.

My invention is adapted to a variety of forms, and can be used in several ways, a few of which I will describe. A frame can be so constructed as to turn back against buildings, fences, &c., and dispense with legs and footpieces attached, props being used instead; or a row of posts set north and south will support two rows of frames, one on each side, made so as to turn back like a trap-door, being held in any position by means of supporters attached to the frame on the upper side, the other end being held to the posts by pins passing through both.

The frame can be elevated or depressed by a series of holes in the supporters. By this method the east vine, when turned back, gets the benefit of the morning's sun and the west the afternoon's.

What I claim as my invention, and desire to secure by Letters Patent, is—

An adjustable elevating and depressing grape-frame, with or without supporters attached, (made of any known material,) for the better cultivation of the grape, which is believed will secure all the advantages hereinbefore specified.

S. OSCAR CROSS.

Witnesses:
WM. H. YOUNG,
JOHN G. CROSS.